(12) United States Patent
Rufo, Jr. et al.

(10) Patent No.: US 6,530,474 B1
(45) Date of Patent: Mar. 11, 2003

(54) INSERTABLE TRAY FOR A MULTIPLE DISC STORAGE CONTAINER

(75) Inventors: George F. Rufo, Jr., Dalton, MA (US); David L. Bolognia, Lanesboro, MA (US)

(73) Assignee: Westvaco Corporation, Stamford, CT (US)

( * ) Notice: Subject to any disclaimer, the term of this patent is extended or adjusted under 35 U.S.C. 154(b) by 0 days.

(21) Appl. No.: 09/930,473

(22) Filed: Aug. 16, 2001

(51) Int. Cl.$^7$ .............................................. B65D 85/57
(52) U.S. Cl. .................................. 206/308.1; 206/310
(58) Field of Search ...................... 206/308.1, 309–310, 206/311, 312, 313, 232, 493

(56) References Cited

U.S. PATENT DOCUMENTS

| | | | |
|---|---|---|---|
| 4,793,480 A | * 12/1988 | Gelardi et al. | 206/308.1 |
| 4,867,302 A | * 9/1989 | Takahashi | 206/308.1 |
| 5,284,243 A | 2/1994 | Gelardi et al. | |
| 5,383,553 A | 1/1995 | Lammerant et al. | |
| 5,685,427 A | 11/1997 | Kuitems et al. | |
| 5,845,771 A | * 12/1998 | Fu | 206/308.1 |
| 5,915,550 A | 6/1999 | Gartz | |
| 6,286,671 B1 | * 9/2001 | Liu et al. | 206/308.1 |

FOREIGN PATENT DOCUMENTS

| | | |
|---|---|---|
| WO | WO 94/19806 | 9/1994 |
| WO | WO 94/25376 | 11/1994 |
| WO | WO 96/23304 | 8/1996 |

* cited by examiner

Primary Examiner—Mickey Yu
Assistant Examiner—Jila M Mohandesi
(74) Attorney, Agent, or Firm—Nixon Peabody LLP; Stuart J. Friedman

(57) ABSTRACT

A tray for holding multiple discs within a storage container which, desirably, is a conventional single disc jewel box, includes a leaf for mounting discs on opposite sides thereof and a shelf substantially rigidly attached, via attachment plates depending from the shelf, to the jewel box base, the leaf being pivotably connected to the shelf via a hinge connection which permits the leaf to pivot thereabout for accessing discs on both sides of the leaf. Flanges cantilevered from the leaf each have an upwardly opening pivot bore for pivotably engaging a pivot pin supported by the shelf. Reinforcing plates depending from opposite sides of the shelf are spaced from the shelf attachment plates for rigidly reinforcing the shelf while permitting the shelf attachment plates to flex, as needed, to engage the jewel box base.

13 Claims, 6 Drawing Sheets

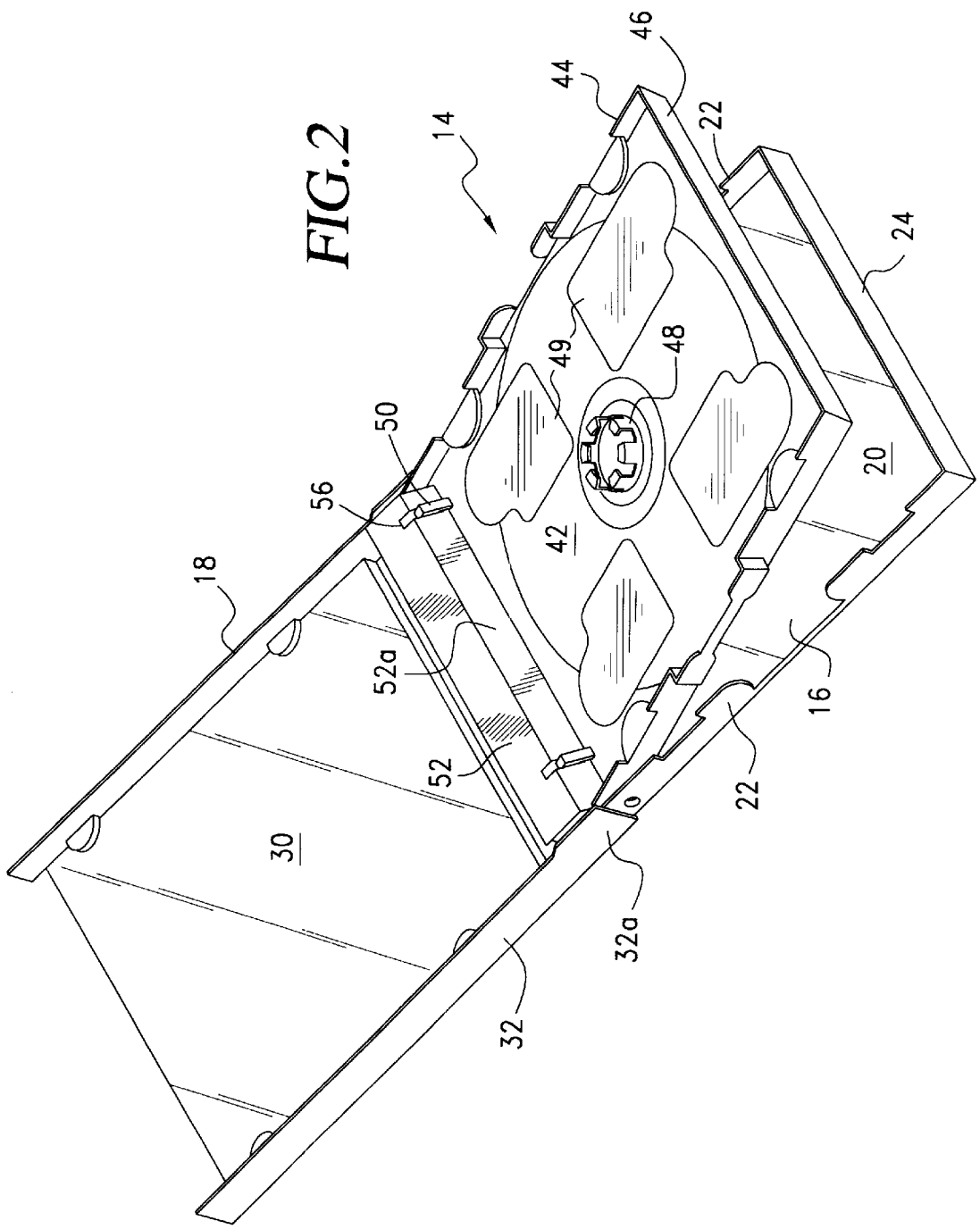

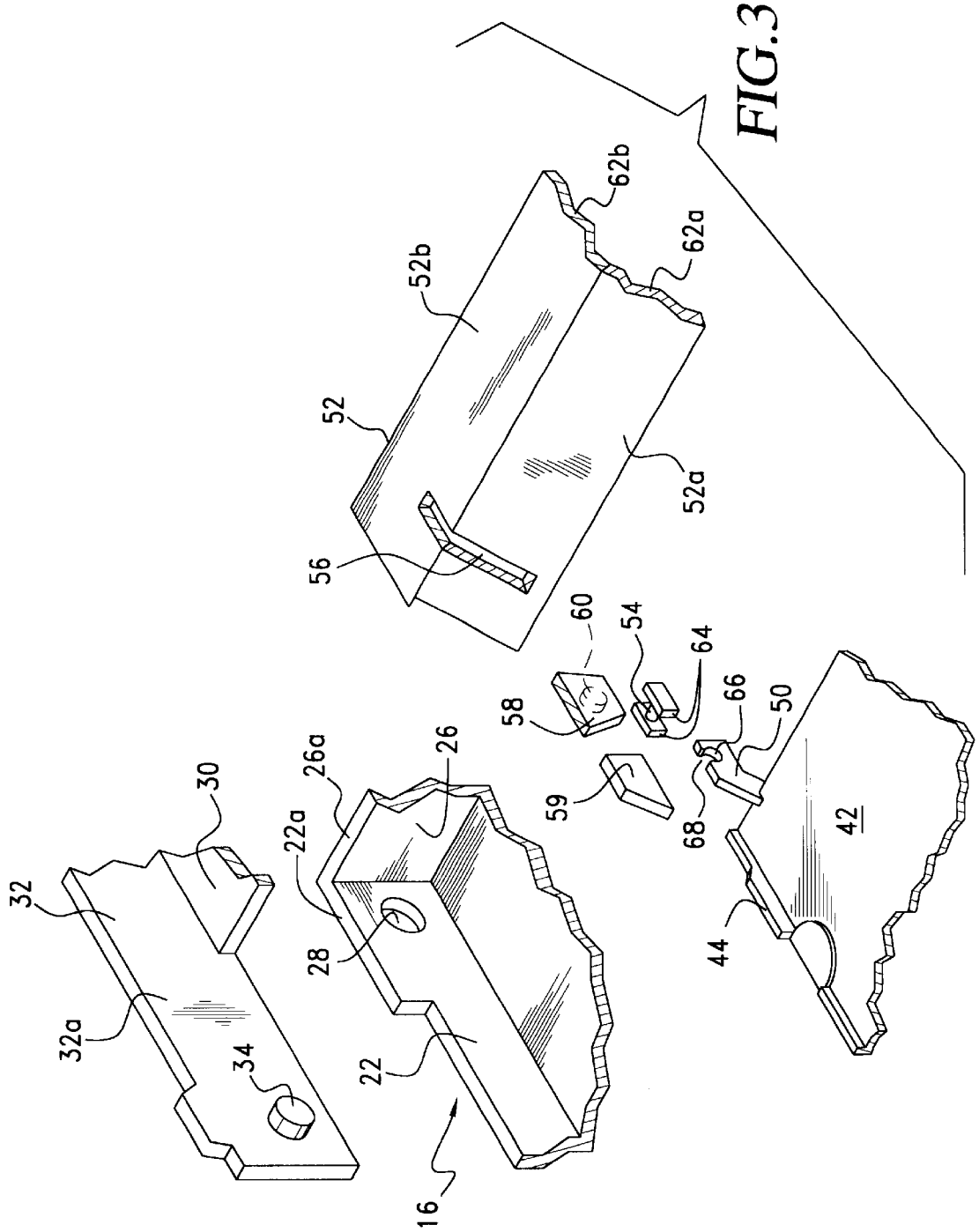

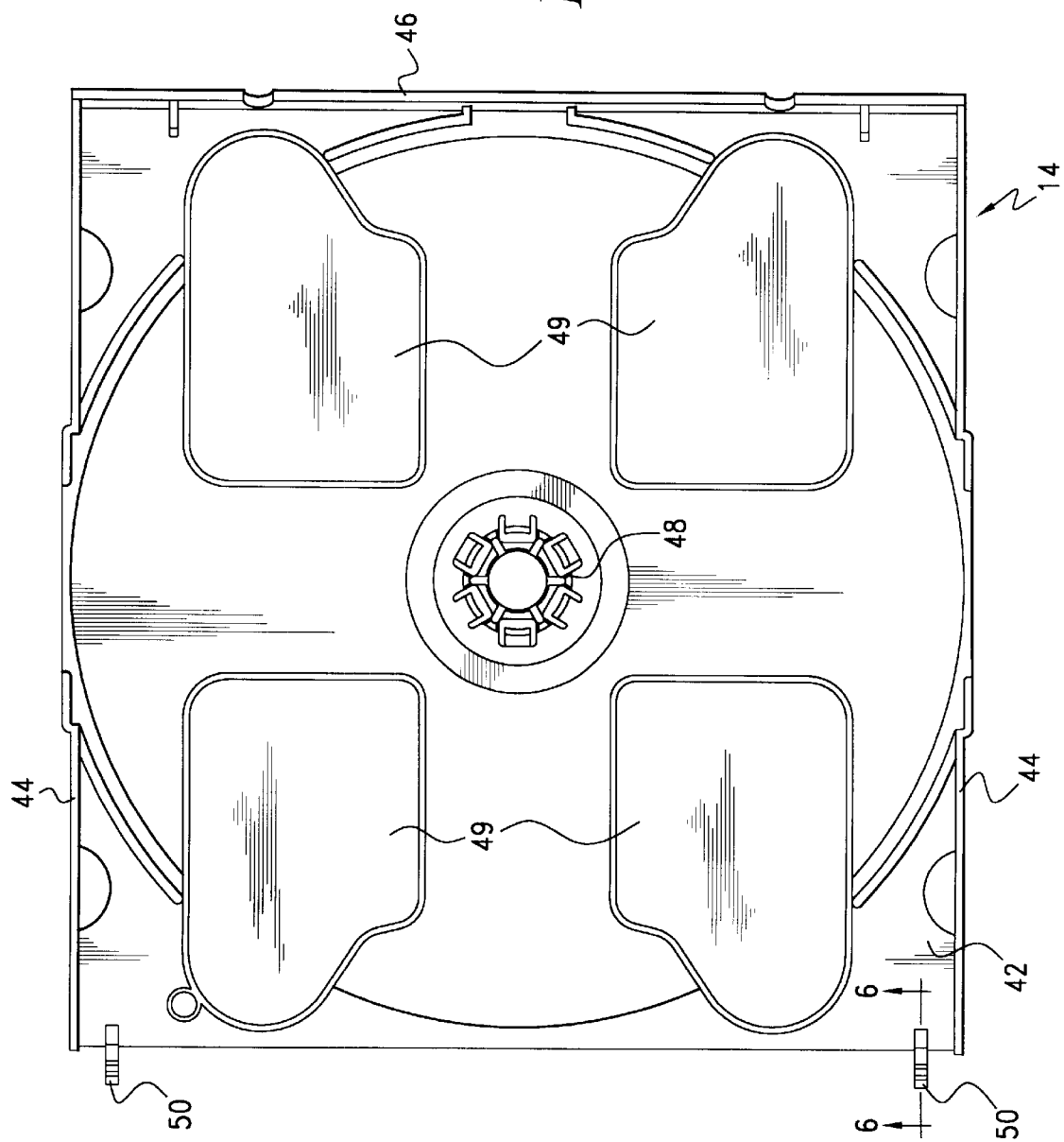

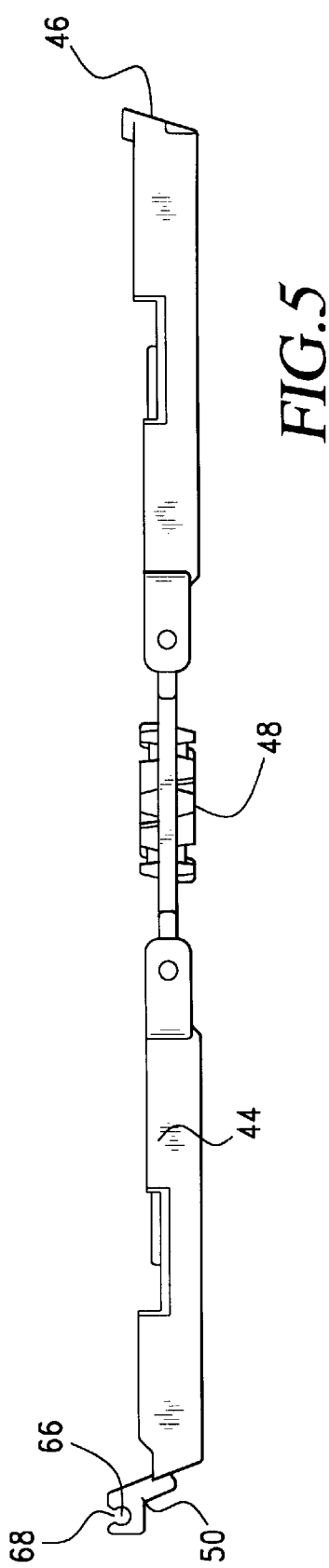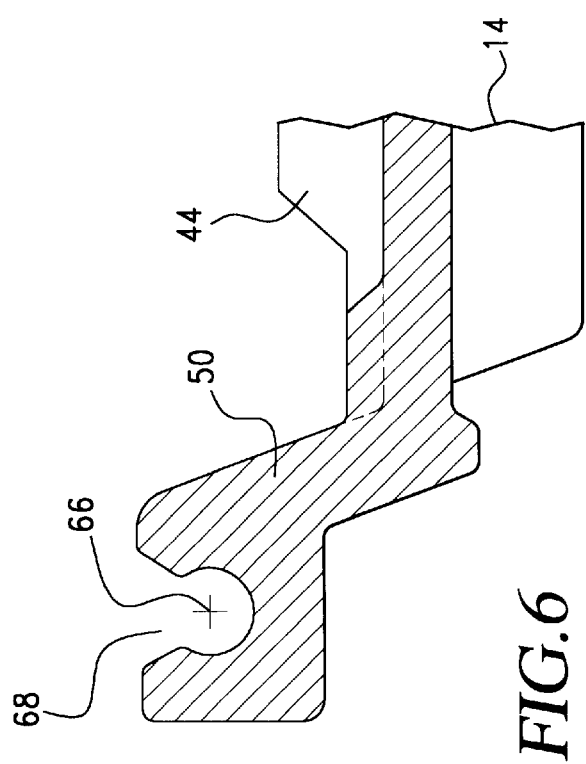

INSERTABLE TRAY FOR A MULTIPLE DISC STORAGE CONTAINER

BACKGROUND OF THE INVENTION

1. Field of the Invention

The present invention relates generally to compact disc storage containers and more particularly, to transparent storage containers capable of holding more than one compact disc.

2. Description of the Prior Art

Various types of planar discs are in use at the present time to record and store information which is to be retrieved by various means, such as by optical or magnetic means. Typical of such discs are compact discs in which information is digitally recorded by use of a laser beam and then read optically by a laser beam. Such discs are used to record audio information, such as musical renditions, video information such as visual images and digital information for use as read only and other memories for use in various applications, such as computer applications. In most instances, at the present time, such discs are sold with information already recorded thereon. In other applications, such discs are sold in blank form and are used by the customer to record information thereon. In the latter case, for example, optical discs are sold for use as computer storage media and are used in hard disc storage systems. As used herein, the term compact disc or CD is intended to encompass all such discs, whatever their size, for all known or proposed uses.

Compact discs containing laser recorded information are typically packaged in injection molded plastic enclosures designed to hold one or more CDs for protecting the discs during storage and shipment. Enclosures commonly used at the present time, such as the well known "jewel box," comprise a three piece assembly consisting of a base or bottom element, an insert or tray in the base/bottom element for positioning and supporting the disc in the base/bottom element, e.g., by a center projection (commonly referred to as a "rosette") which engages the periphery of the aperture in the center of the disc, and a lid or cover which is hinged to the base/bottom element and is closed thereon after the disc is mounted therein on the tray. The enclosure is, typically, at least partially transparent and graphics relating to the disc and containing trademark and sales promotional information are usually inserted in such a manner as to be visible through the enclosure.

In recent years a need has arisen to package more than one, usually two, compact discs in each storage container. The most apparent packaging solution, increasing the length or thickness of the conventional jewel box to accommodate the additional disc or discs, has proven unacceptable to both industry and the consumer. Industry already has a very substantial investment in automated packaging equipment designed specifically for the conventional sized jewel box. Any change in the storage container size would require the construction and installation, at very considerable expense, of a separate automated packaging line designed for the new storage container. It would also require that manufacturers warehouse multiple storage container sizes. Moreover, larger storage containers take up considerably more retail shelf space and, accordingly, reduce the available shelf inventory in retail stores. Consumers, like retailers, find that the larger size storage containers take up more space and are more difficult to store. As a result, there has been a growing consensus that multiple disc storage containers be based upon the identical dimensions of the conventional jewel box.

One of the most commercially popular multiple disc storage containers is disclosed in U.S. Pat. No. 5,284,243—Gelardi et al, which discloses a two CD tray for insertion into a conventional jewel box. Such jewel boxes comprise a base provided with raised peripheral edges and a lid, hinged to the base, provided with depending side walls which are complementary to the raised edges of the base. The cover is hinged to the base via lugs which extend inwardly from opposite side walls of the cover and are received in apertures formed in opposite raised edges of the base. Importantly, the lugs extend only part way through the apertures since these same apertures are used for mounting the two CD tray on the base. The tray comprises a generally flat leaf having first and second CD mounting rosettes on opposite faces of the leaf. A shelf is formed along one side of the leaf and includes a rising portion extending upward from the leaf and an elevated portion generally parallel to the leaf, with the two portions hingedly connected via a living hinge. A pair of side plates depend from opposite ends of the elevated portion of the shelf and include outwardly extending stubs for insertion into the aforementioned apertures such that, within the apertures, the stubs extend toward the lugs. With the stubs engaged within the apertures and the bottom surface of the elevated shelf portion in contact with the upper ends of the raised edges, the shelf is rigidly held in place on the base with the tray capable of pivoting 180° about the living hinge.

The Gelardi et al two CD tray utilizes a living hinge to provide access to both CDs by pivoting of the tray. In order for a living hinge to function it must be formed of a material, such as non-crystalline styrene, styrene-polypropylene and styrene-polyethylene copolymers, which is flexible and can be repeatedly pivoted without breaking. However, such materials are not transparent and the marketplace is presently demanding transparent storage containers molded from transparent materials, such as crystalline polystyrene, to provide additional viewing surfaces for advertising and graphics. The problem with the use of highly transparent materials such as crystalline polystyrene is that the material is extremely brittle and fractures quite easily. Therefore, such a brittle material cannot be used as the living hinge in the Gelardi et al two CD trays.

One approach to providing a highly transparent two CD storage container formed of crystalline styrene is disclosed in PCT International Publication No. WO 96/23304 which discloses the use of a crystalline styrene tray very similar to the tray of Gelardi et al. A line of weakness or fold line, as in Gelardi et al, is defined between the elevated and rising portions of the shelf. However, by the process of overmolding, a flexible sheet of synthetic material is adhered over the line of weakness and to the surfaces of the elevated and rising portions. Since the tray is molded of brittle crystalline styrene, the first time that the tray is pivoted, the line of weakness fractures, leaving only the overmolded flexible sheet to serve as the hinge, permitting the tray to pivot 180°. An important difficulty with this approach is that it makes the molding process difficult and slow and, therefore, is prohibitively expensive.

Another approach is to configure the two CD tray as in Gelardi et al except, in lieu of a living hinge, utilize a pair of spaced apart molded mechanical hinges to pivotally join the tray to the shelf. One embodiment of this approach is disclosed in U.S. Pat. No. 5,915,550—Gartz which shows a two CD tray insert for mounting and nesting within the base of a conventional jewel box. The insert comprises a tray having disc receiving planar surfaces on opposite sides thereof and a rosette centrally disposed on each of the planar surfaces to receive and hold CDs on both sides of the tray.

A shelf is non-pivotably, substantially rigidly mounted to the base of the jewel box and the tray is pivotably mounted, via a pair of mechanical hinges, to the tray. Specifically, a pair of flanges formed integrally with the tray extend rearwardly from opposite sides thereof, through cutouts in the shelf into pivotable engagement with plates which depend from the shelf. Apertures/pins on the ends of the rearwardly extending flanges engage pins/apertures on the plates for permitting the tray to pivot 180° for accessing CDs on both sides of the tray. The problem with this approach is that the extreme brittleness of crystalline polystyrene has caused mechanical hinge designs proposed to date to fail as a result of processing on automated packaging lines, frequent opening and closing associated with normal use of a CD storage container, shipping or when inadvertently dropped or struck against a hard surface.

It will be appreciated that despite the marketplace demand for highly transparent multiple CD storage containers and the considerable efforts to date directed at solving the problems arising from the brittleness of the crystalline styrene material from which these containers are typically made, a fully satisfactory multiple CD storage container has not yet been developed. This is because containers proposed to date have either been uneconomical to manufacture or unreliable in use. Accordingly, there remains a need for a simple, inexpensive to manufacture, relatively sturdy transparent multiple CD storage container.

SUMMARY OF THE INVENTION

It is therefore a primary object of the present invention to provide a multiple CD storage container which can be injection molded of a transparent, highly brittle plastic material yet which is inexpensive to manufacture and sufficiently durable to withstand the rigors of normal manufacturing, packaging, shipping and consumer usage of a CD storage container.

It is another object of the present invention to provide a multiple CD storage container which utilizes a tray for holding two CDs which fits and is mountable within an unmodified conventional single disc jewel box.

It is also an object of the present invention to provide a multiple CD storage container including a two CD tray mounted to a jewel box in a particularly sturdy and reliable pivotable arrangement which is highly durable and minimizes breakage in use despite being formed of transparent, highly brittle plastic material.

It is another object of the present invention to provide a sturdy, durable mounting arrangement for a two CD tray in the base of a conventional jewel box including mounting flanges on the tray having upwardly opening pivot bores for receiving and pivotably retaining pivot pins therein.

It is still another object of the present invention to provide a multiple CD storage container including a shelf substantially rigidly mounted in the base of a conventional jewel box by shelf attaching means for pivotably mounting a multiple CD tray thereto in such a manner that the tray is pivotable through a 180° arc for providing access to CDs mounted on both sides thereof, the shelf having reinforcing plates depending from opposite sides thereof and spaced from the shelf attaching means for rigidly reinforcing the shelf while permitting the shelf attaching means to flex, as needed, to engage the jewel box base.

The foregoing and other objects are achieved in accordance with the present invention by providing a tray for holding multiple discs within a storage container having a container cover and a container base, the tray comprising:

A. a leaf having first and second opposite sides, each side incorporating a disk engagement means for engaging and holding a disc, said leaf being dimensioned to fit within said base when said container is closed;

B. an elongate shelf adapted to be pivotably connected to said leaf along one edge thereof, the shelf having attaching means for substantially rigidly attaching it to said base; and C. hinge means between the shelf and the leaf for providing relative rotational movement therebetween, whereby discs engaged on either the first or second sides of said leaf can be accessed by rotating the leaf about said hinge means when the container is open; wherein D. at least one flange is cantilevered from said one edge of said leaf and extendstoward said shelf;

E. at least one elongate pivot pin is supported from the underside of said shelf, the longitudinal extent of said pin being generally parallel to the longitudinal extent of said shelf, said pin being spaced below the underside of said shelf; and F. the free end of said flange has an upwardly opening pivot bore therein, said bore penetrating said flange in a direction substantially parallel to said one edge of said tray and being dimensioned to receive and pivotably retain said at least one pivot pin which is downwardly inserted therein, whereby said leaf is pivotable through 180° about said at least one pivot pin for providing access to discs engaged on either side of said leaf.

In another aspect of the invention, there is provided such a tray wherein said attaching means comprises first and second shelf attachment means provided on first and second opposite sides of the shelf, said first and second attachment means comprise first and second end plates supported by and depending from said shelf, each of said end plates having a mounting pin projecting outwardly therefrom for engaging mounting apertures in said base for non-pivotably and substantially rigidly mounting said shelf to said base, said tray further including reinforcing means comprising first and second reinforcing plates provided on said first and second opposite sides of said shelf, said reinforcing plates depending from said shelf and being mounted forward of and spaced from the corresponding end plates on each side of said shelf for rigidly reinforcing the underside of said shelf while permitting said end plates to flex inwardly and outwardly, as needed, to engage said mounting pins in said mounting apertures.

BRIEF DESCRIPTION OF THE DRAWINGS

FIG. 2 is a perspective view of the multiple CD tray inserted within the base of the jewel box for 180° rotation.

FIG. 3 is an exploded perspective view of one corner of one embodiment of the pivot assembly for the multiple CD storage container of the present invention.

FIG. 4 is a plan view of the multiple CD tray of the present invention.

FIG. 5 is a front elevation view of the multiple CD tray of the present invention.

FIG. 6 is a sectional view of the rearwardly extending tray flange taken along line 6—6 in FIG. 4.

DESCRIPTION OF THE PREFERRED EMBODIMENT

Figure 1:
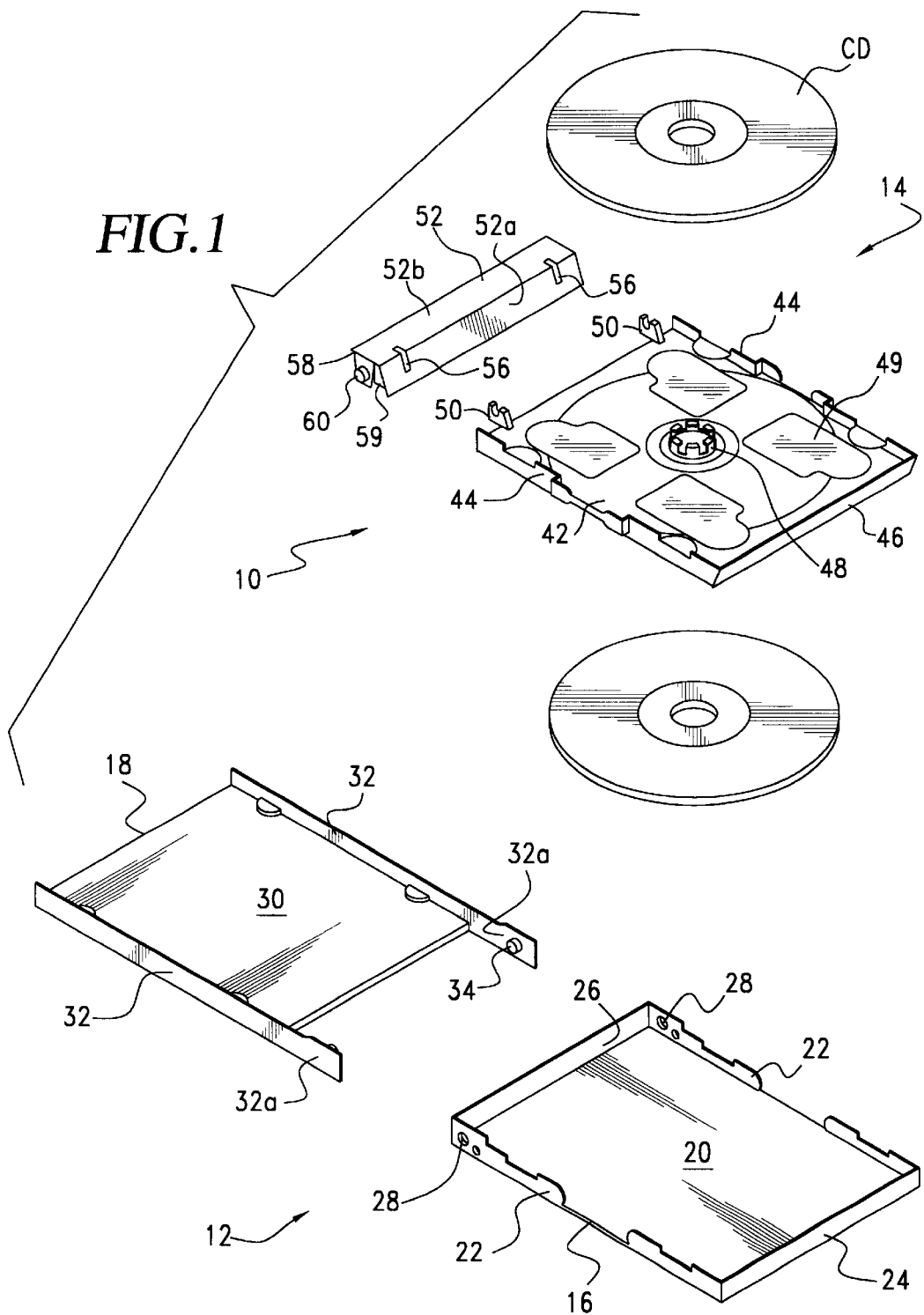
FIG. 1 is an exploded perspective view of the multiple CD storage container of the present invention showing the disassembled jewel box, insertable multiple CD tray and two CDs intended for insertion onto the tray.
Figure 7:
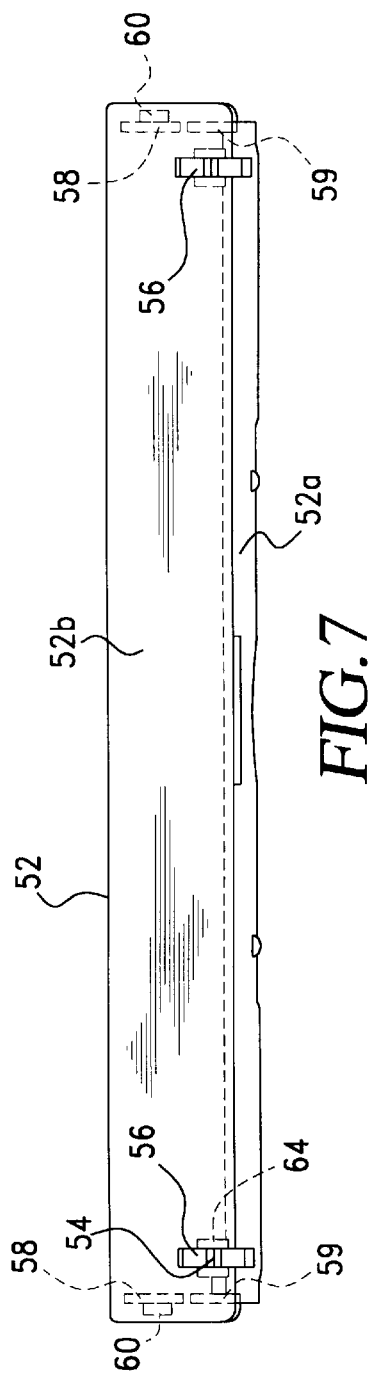
FIG. 7 is a plan view of the shelf of the multiple CD tray of the present invention.
Figure 8:
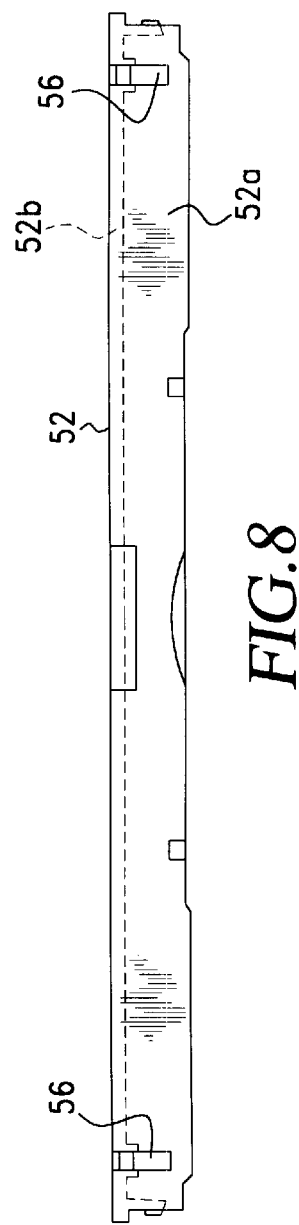
FIG. 8 is a side elevation view of the shelf of the multiple CD tray of the present invention.
Figure 9:
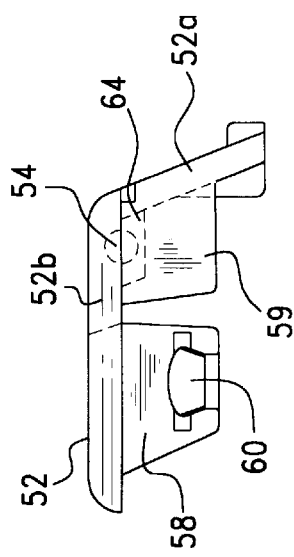
FIG. 9 is a front elevation view of the shelf of the multiple CD tray of the present invention.

A preferred embodiment of the present invention is illustrated in FIGS. 1–9 in which there is shown an improved storage container 10 for housing multiple CDs. The storage container includes a conventional jewel box 12 and an injection molded multiple CD plastic tray 14. The conventional jewel box 12 comprises a base 16 and a cover 18 which are hingedly connected for pivotal movement. Base 16 has a flat rectangular floor 20, lateral sidewalls 22, a front wall 24 and a spine wall 26. Pivot pin receiving apertures 28 are formed in the sidewalls 22 adjacent spine wall 26. Cover 18 includes a flat rectangular top 30 and sidewalls 32 depending therefrom which are complementary to the sidewalls 22 of the base 16 and enclose base sidewalls 22 when the cover 18 is attached to base 16 and closed thereon. Sidewalls 32 of cover 18 have forward projecting extensions 32a thereon, each of which mount an inwardly projecting pivot pin 34. Pivot pins 34 project inwardly and fit within pivot pin apertures 28 for providing a pivot axis about which cover 18 may be pivoted through 180° for opening and closing storage container 10. Pivot pins 34 typically extend only part way through apertures 28 for reasons which will be described more fully hereinafter.

Multiple CD tray 14 comprises a generally flat leaf 42 having opposite lateral sidewalls 44 and a front wall 46 defining a generally rectangular shape for leaf 42 which is sized to nest within base 16. Leaf 42 includes first and second CD retaining rosettes 48 on opposite faces of the leaf 42 for receiving and retaining a CD on each face of tray 14 and finger recesses 49 for allowing the user to grasp the peripheral edges of the CD for removal from the rosette 48. A pair of rearwardly projecting flanges 50 are integrally molded to the rear edge of flat leaf 42 for pivotably connecting tray 14 to base 16 through a shelf 52 which supports tray pivot pins 54 to which tray 14 is pivotably connected through flanges 50 in the manner hereinafter described. Shelf 52 extends generally between sidewalls 22 of base 16 for mounting tray 14 and positioning it in a nesting relationship within base 16. In a preferred embodiment, shelf 52 includes a front wall portion 52a which extends downward and forward from the front margin of top wall portion 52b to tray 14 and defines with top wall portion 52b a slightly obtuse angle, desirably about 110°. Flanges 50 project rearwardly through front wall portion 52a and pivotably connect to flange pivot pins 54 which are supported along the underside of shelf 52. The flanges 50 are free to move within cutouts 56 formed in top wall portion 52b and front wall portion 52a to allow tray 14 to pivot in an 180° arc about tray pivot pins 54 for providing access to the CDs on both faces of tray 14.

With particular reference to FIG. 3, which illustrates an exploded view of the corner of base 16 defined between sidewall 22 and spine wall 26, it can be seen that cover sidewall extensions 32a mount an inwardly projecting pivot pin 34 which is received within pivot pin apertures 28 in sidewalls 22 of base 16. Shelf 52 includes a first pair of side plates 58 which depend from the underside of the shelf top wall portion 52b along opposite sides or end portions thereof for non-pivotably mounting shelf 52 to base 16 between lateral sidewalls 22 of base 16. Each side plate 58 has a mounting pin 60 extending outwardly therefrom toward adjacent sidewall 22 for insertion into pivot pin apertures 28 from the inside of the base such that, within apertures 28, mounting pins 60 extend toward pivot pins 34. It will be appreciated that mounting pins 60 have a relatively shallow depth so as not to interfere with the rotation of pivot pins 34 within pivot pin apertures 28. With mounting pins 60 engaged within apertures 28, the bottom surface 62b of top wall portion 52b contacts the upper surface 22a of sidewalls 22 adjacent spine wall 26 and the upper surface 26a of spine wall 26 for maintaining shelf 52 substantially rigidly in place on the base.

A second pair of side plates 59 extend between the underside 62b of the shelf top wall portion 52b, along opposite sides or end portions thereof, and the underside 62a of the shelf front wall portion 52a for defining a supporting rib in engagement with both wall portions which maintains the structural integrity of the obtuse-angled structure of shelf 52. Side plates 59 include a top wall portion 59b and front wall portion 59a which define therebetween an obtuse angle corresponding to the obtuse angle defined between shelf top and front wall portions 62b, 62a.

Preferably, the first pair of side plates 58 are mounted immediately rearwardly of, but spaced from, the rear of the second pair of side plates 59 and in front to back alignment therewith. This configuration permits the front pair of plates 59 to perform their reinforcing function without interfering with the side-to-side flexibility of the rear pair of plates 58, which facilitates plates 58 flexing inwardly and outwardly, as and when needed, to engage mounting pins 60 within pivot pin apertures 28. Shelf 52 also includes two pair of pivot pin support flanges 64 which, like-side plates 58, depend from the underside 62b of the shelf top wall portion 52b with a member of each flange pair positioned on each side of cutouts 56 for supporting a tray pivot pin 54 therebetween in such a manner that each tray pivot pin 54 spans the opening defined by each cutout 56.

As shown most clearly in FIGS. 3 and 6, at the rearward end of each rearwardly projecting flange 50 a pivot bore 66 is formed penetrating each flange 50 in a direction substantially parallel to the rear margin of tray 14. From about the rear upper edge of each flange 50, above pivot bore 66, an upwardly opening insertion slot 68 extends downwardly into communication with the pivot bore 66. In the preferred embodiment, the insertion slot 68 is generally V-shaped or truncated cone shaped. At its upper edge each insertion slot 68 has a width at least as wide as the diameter of the tray pivot pin 54. The insertion slot 68 tapers in the direction toward the pivot bore 66 so that a tray pivot pin 54 inserted from the top edge may easily be positioned in the insertion slot 68 but must be forced downwardly into the pivot bore 66, spreading apart the walls of the insertion slot 68 as it moves downwardly until the tray pivot pin 54 moves past the narrowest diameter portion of the insertion slot 68 and snaps into the pivot bore 66. With flanges 50 extending through cutouts 56 and tray pivot pins 54 engaged within pivot bores 66, tray 14 is pivotable through 180° about an axis extending through tray pivot pins 54, which axis is parallel to the pivot axis extending through pivot pins 34 and mounting pins 60, for providing access to the CDs on both faces of tray 14.

It will be appreciated that configuring the hinged connection of tray 14 to base 16 in the manner hereinbefore described establishes a sturdy, reliable pivotable mounting arrangement which is highly durable despite being formed of transparent, highly brittle plastic material, such as crystalline polystyrene. In particular, providing upwardly opening insertion slots 68 in flanges 50 for receiving pivot pins 54 by downward insertion of the pins 54 relative to the slots 68 minimizes breakage of the flanges during insertion. By comparison, it has been noted that when the insertion slots are oriented so as to be rearwardly opening, as is disclosed in U.S. Pat. No. 5,915,550—Gartz, the flanges tend to laterally buckle under the rearward pressure required to snap the pivot pins into the insertion slots. The jewel box portion of the storage container is formed in conventional manner as is well known in the art. The tray will be molded separately from the base and cover and can be molded in such a manner that the shelf is formed either separately or integrally therewith.

While the present invention has been described in terms of specific embodiments thereof, it will be understood that no limitations are intended to the details of construction or design other than as defined in the appended claims.

What is claimed is:

1. In a tray for holding multiple discs within a storage container having a container cover and a container base, said tray comprising:
  A. a leaf having first and second opposite sides, each side incorporating a disk engagement means for engaging and holding a disc, said leaf being dimensioned to fit within said base when said container is closed;
  B. an elongate shelf adapted to be pivotably connected to said leaf along one edge thereof, the shelf having attaching means for substantially rigidly attaching it to said base; and
  C. hinge means between the shelf and the leaf for providing relative rotational movement therebetween, whereby discs engaged on either the first or second sides of said leaf can be accessed by rotating the leaf about said hinge means when the container is open;

the improvement comprising:
  D. at least one flange cantilevered from said one edge of said leaf and extending toward said shelf;
  E. at least one elongate pivot pin supported from the underside of said shelf, the longitudinal extent of said pin being generally parallel to the longitudinal extent of said shelf, said pin being spaced below the underside of said shelf; and
  F. the free end of said flange having an upwardly opening pivot bore therein, said bore penetrating said flange in a direction substantially parallel to said one edge of said tray and being dimensioned to receive and pivotably retain said at least one pivot pin which is downwardly inserted therein, whereby said leaf is pivotable through 180° about said at least one pivot pin for providing access to discs engaged on either side of said leaf.

2. A tray, as claimed in claim 1, wherein said container is a standard compact single disc jewel box container.

3. A tray, as claimed in claim 1, further including at least one slot defined in said shelf, means supported by said shelf for mounting said pivot pin such that it spans the opening defined by said at least one slot, said at least one flange extending through said slot whereby said upwardly opening pivot bore pivotably engages said pivot pin.

4. A tray, as claimed in claim 3, wherein the number of flanges, pivot pins and slots are equal.

5. A tray, as claimed in claim 4, wherein there are two flanges, pivot pins and slots.

6. A tray, as claimed in claim 1, wherein said attaching means comprises first and second shelf attachment means provided on first and second opposite sides of the shelf, said first and second attachment means comprising first and second end plates supported by and depending from said shelf, each of said end plates having a mounting pin projecting outwardly therefrom for engaging mounting apertures in said base for non-pivotably and substantially rigidly mounting said shelf to said base, said tray further including:
  reinforcing means comprising first and second reinforcing plates provided on said first and second opposite sides of said shelf, said reinforcing plates depending from said shelf and being mounted forward of and spaced from the corresponding end plates on each side of said shelf for rigidly reinforcing the underside of said shelf while permitting said end plates to flex inwardly and outwardly, as needed, to engage said mounting pins in said mounting apertures.

7. A tray, as claimed in claim 6, wherein said shelf comprises a front wall portion extending downwardly and forwardly, toward said one edge of said leaf, from the front margin of a top wall portion, said front and top wall portions defining an obtuse angle therebetween, each said reinforcing plate having a top wall portion and a front wall portion defining a corresponding obtuse angle therebetween, said top and front wall portions of each said reinforcing plate engaging the undersides of said top and front wall portions, respectively, of said shelf.

8. In a storage container for holding multiple discs, said container comprising a standard single disc jewel box having a base and a pivotably mounted lid which rotates 180° with respect to said base for opening and providing access to the inside of said container, a leaf having first and second opposite sides, each side incorporating a disk engagement means for engaging and holding a disc, said leaf being dimensioned to fit within said base when said container is closed, an elongate shelf adapted to be pivotably connected to said leaf along one edge thereof, the shelf having attaching means for substantially rigidly attaching it to said base, and hinge means between the shelf and the leaf for providing relative rotational movement therebetween, whereby discs engaged on either the first or second sides of said leaf can be accessed by rotating the leaf about said hinge means when the container is open, the improvement comprising:
  A. at least one flange cantilevered from said one edge of said leaf and extending toward said shelf;
  B. at least one elongate pivot pin supported from the underside of said shelf, the longitudinal extent of said pin being generally parallel to the longitudinal extent of said shelf, said pin being spaced below the underside of said shelf; and
  C. the free end of said flange having an upwardly opening pivot bore therein, said bore penetrating said flange in a direction substantially parallel to said one edge of said tray and being dimensioned to receive and pivotably retain said at least one pivot pin which is downwardly inserted therein, whereby said leaf is pivotable through 180° about said at least one pivot pin for providing access to discs engaged on either side of said leaf.

9. A storage container, as claimed in claim 8, further including at least one slot defined in said shelf, means supported by said shelf for mounting said pivot pin such that it spans the opening defined by said at least one slot, said at least one flange extending through said slot whereby said upwardly opening pivot bore pivotably engages said pivot pin.

10. A storage container, as claimed in claim 9, wherein the number of flanges, pivot pins and slots are equal.

11. A storage container, as claimed in claim 10, wherein there are two flanges, pivot pins and slots.

12. A storage container, as claimed in claim 8, wherein said attaching means comprises first and second shelf attachment means provided on first and second opposite sides of the shelf, said first and second attachment means comprising first and second end plates supported by and depending from said shelf, each of said end plates having a mounting pin projecting outwardly therefrom for engaging mounting apertures in said base for non-pivotably and substantially rigidly mounting said shelf to said base, said tray further including:

reinforcing means comprising first and second reinforcing plates provided on said first and second opposite sides of said shelf, said reinforcing plates depending from said shelf and being mounted forward of and spaced from the corresponding end plates on each side of said shelf for rigidly reinforcing the underside of said shelf while permitting said end plates to flex inwardly and outwardly, as needed, to engage said mounting pins in said mounting apertures.

13. A tray, as claimed in claim 12, wherein said shelf comprises a front wall portion extending downwardly and forwardly, toward said one edge of said leaf, from the front margin of a top wall portion, said front and top wall portions defining an obtuse angle therebetween, each said reinforcing plate having a top wall portion and a front wall portion defining a corresponding obtuse angle therebetween, said top and front wall portions of each said reinforcing plate engaging the undersides of said top and front wall portions, respectively, of said shelf.

* * * * *